United States Patent
Lakkimsetti et al.

(10) Patent No.: US 12,541,613 B2
(45) Date of Patent: Feb. 3, 2026

(54) PROTECTING DATA DURING NON-BUSINESS HOURS

(71) Applicant: Dell Products L.P., Round Rock, TX (US)

(72) Inventors: Praveen Kumar Lakkimsetti, Dublin, CA (US); Madhu Agrahara Gopalakrishna, Pleasanton, CA (US); Mahadev Karadigudda, San Jose, CA (US); Senthil Ponnuswamy, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 18/625,334

(22) Filed: Apr. 3, 2024

(65) Prior Publication Data
US 2025/0315540 A1    Oct. 9, 2025

(51) Int. Cl.
*G06F 21/62*    (2013.01)

(52) U.S. Cl.
CPC .............................. *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 6,542,930 B1 * | 4/2003 | Auvenshine | ............ | G06F 16/10 709/224 |
| 8,095,756 B1 * | 1/2012 | Somavarapu | ....... | G06F 11/1461 711/163 |
| 8,452,741 B1 * | 5/2013 | Kuhr | ..................... | G06F 16/125 707/694 |
| 11,822,680 B1 * | 11/2023 | Speers | ..................... | G06F 9/543 |
| 12,235,961 B1 * | 2/2025 | Davies | .................. | G06F 21/568 |
| 2003/0126446 A1 * | 7/2003 | Debiez | ............... | G11B 20/0021 713/178 |
| 2005/0076042 A1 * | 4/2005 | Stakutis | ................... | G06F 16/20 |
| 2007/0094471 A1 * | 4/2007 | Shaath | ................ | G06F 12/1466 711/163 |
| 2010/0306283 A1 * | 12/2010 | Johnson | ................ | G06F 16/125 707/821 |
| 2017/0060897 A1 * | 3/2017 | Madaan | ................ | G06F 16/125 |
| 2017/0091479 A1 * | 3/2017 | Pluder | ................. | G06F 21/6245 |
| 2018/0039653 A1 * | 2/2018 | Bailey | ..................... | G06F 16/162 |
| 2019/0207929 A1 * | 7/2019 | Koorapati | ............... | G06F 16/11 |
| 2019/0331701 A1 * | 10/2019 | Polley | ................ | G01N 35/0099 |
| 2022/0083514 A1 * | 3/2022 | Rath | .................... | G06F 16/1774 |
| 2022/0382713 A1 * | 12/2022 | Sadiq | ...................... | G06F 16/27 |

(Continued)

*Primary Examiner* — Hieu T Hoang
(74) *Attorney, Agent, or Firm* — Chamberlain, Hrdlicka, White, Williams & Aughtry; Aly Z. Dossa

(57) ABSTRACT

One or more embodiments relates to a method for protecting a system during non-business hours. The method comprising: initiating, by a data manager and based on a security policy, a secure period; receiving, after the initiating, a first data operation request from a client device on a customer system; making a first determination that the first data operation request specifies a destructive operation of data in a storage system; making a second determination, using the security policy, that the first data operation request is restricted; and restricting, in response to the second determination, destructive operations of data specified in the first data operation request.

17 Claims, 6 Drawing Sheets

(56) References Cited

U.S. PATENT DOCUMENTS

| | | | |
|---|---|---|---|
| 2023/0185474 A1* | 6/2023 | Chang | G06F 3/0638 |
| | | | 711/154 |
| 2024/0202162 A1* | 6/2024 | Elango | G06F 11/1461 |
| 2024/0275814 A1* | 8/2024 | George | H04L 63/1425 |
| 2024/0419797 A1* | 12/2024 | Darling | G06F 21/566 |
| 2025/0138946 A1* | 5/2025 | Srinath | G06F 11/1448 |

* cited by examiner

PROTECTING DATA DURING NON-BUSINESS HOURS

BACKGROUND

In a computing environment accessible via a network, security measures such as limiting access to a system are used to protect the system from destructive data operations initiated by an attacker of the computing environment. During normal business hours, a system administrator monitoring the computing environment may respond to detected potential attacks. However, ransomware attacks initiating the destructive data operations may happen outside of business hours, when a system administrator is not actively monitoring the computing environment. However, an attacker may obtain access administrator credentials, allowing them to attack the system at any time.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
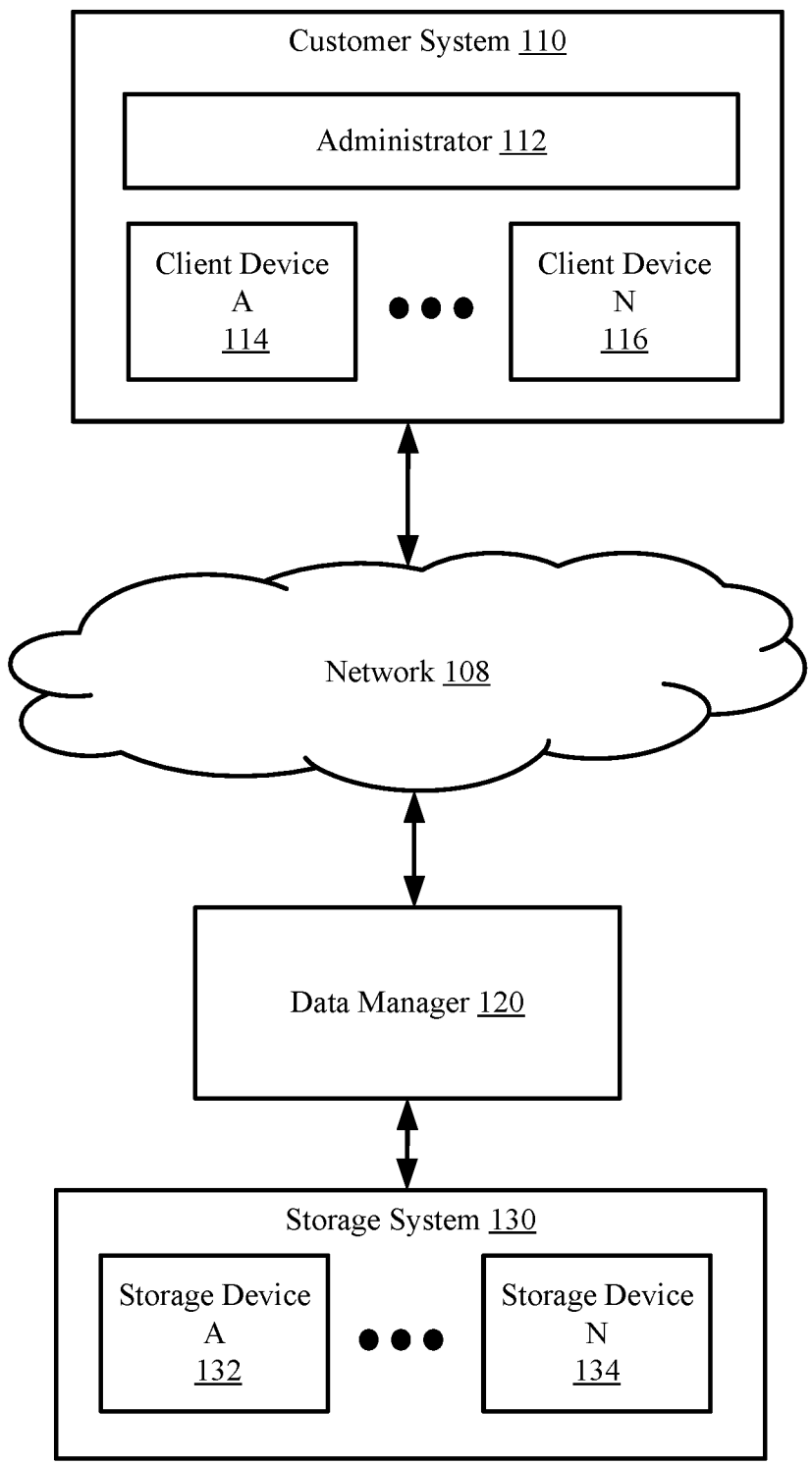
FIG. 1A shows a diagram of a system including a data manager in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to system and methods for protecting a storage system against ransomware attacks from attackers during non-business hours. Storage systems generally support operations that allow users to delete data on a system-wide or tier-wide basis, as such operations can be beneficial in the cases of decommissioning or reinitializing a storage system. For example, a customer may want to destroy any duplicated copies of a file on a system-wide basis. Currently, destructive data operations are required to be performed by users with administrative roles. However, the capability of a storage system to mass-delete customer files could be used against a customer during a ransomware attack, leading to total data loss if an attacker gains access to customer system credentials that allow them to bypass current security measures. Current implementations of security measures against destructive operations include security checks and monitoring by a user with an administrative role, but these measures do not protect against an attack if an attacker has gained access to system credentials or if an administrator is not actively monitoring the system, such as, for example, outside of normal business hours. This leaves a customer system particularly vulnerable when an administrator is not actively monitoring the system, leading to ransomware attacks occurring during non-business hours without any administrative response until after any destroyed data becomes irrecoverable. Embodiments of the invention disclosed herein provide security policies are enforced in order to restrict and catalog all destructive data operations that are attempted during predefined periods of time, therefore defending against attackers and protecting customer data regardless of whether the administrator is actively monitoring the system. The implementation of secure periods reduce risk by preventing destructive data operations specified. In one or more embodiments, a data manager connects a customer system to a storage system. The data manager is responsible for managing the aforementioned security policies, which will prevent destructive data operations from occurring when an administrator is not actively monitoring the system. The data manager initiates secure periods based on a plurality of security policies, and continuously updates the customer system when secure periods begin or end. During secure periods, the data manager may prevent or allow data operation requests based on what data operation requests the security policies dictate are restricted at the time. The customer system may also be notified of any attempts made to conduct destructive data operations during any secure period.

FIG. 1A shows a diagram of a system in accordance with one or more embodiments of the invention. The system may include a network (108), a customer system (110), a data manager (120), and a storage system (130). The system may include additional, fewer, and/or other components without departing from the invention. Each of the components in the system may be operatively connected via any combination of wireless and/or wired networks, e.g., the network (108).

In one or more embodiments, the network (108) is the network that performs the functionality of allowing communication between components of the system described throughout this application. A network (e.g., network (108)) may refer to an entire network or any portion thereof (e.g., a logical portion of the devices within a topology of devices). A network may include a data center network, wide area network, local area network, wireless network, cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1A, the network (108, FIG. 1A) may include any number of devices within any components (e.g., 110, 120, 130) of the system, as well as devices external to or between such components of the system. A network device may include any other components without departing from the invention. Examples of a network device include, but are not limited to, a network switch, router, multilayer switch, fiber channel device, an InfiniBand® device, etc. A network device is not limited to the aforementioned specific examples.

The network (108) may include any number of devices within any components of the system, as well as devices external to or between such components of the system. The network (108) provides the operative connectivity between the customer system (110), the data manager (120), and the storage system (130). Each of the aforementioned system components connected by the network (108) will be described in detail below.

In one or more embodiments, the customer system (110) may include an administrator (112) and a plurality of client devices (114, 116) without departing from the scope of the invention. The customer system (110) may include additional, fewer, and/or different components without departing from the invention. Each of the aforementioned components of the customer system (110) is discussed below.

In one or more embodiments, an administrator (112) may refer to a user or a computing device (See FIG. 3) operated by the user of the customer system (110) with an administrative role, who actively monitors the customer system (110) during business hours. An administrator (112) may possess customer system credentials (126, FIG. 1B) required to bypass any security checks that may be implemented on the customer system (110) and conduct destructive operations. As discussed throughout this disclosure, destructive data operations may refer to any data processing operations that specify the destruction of customer data in the storage system (130), discussed below.

In one or more embodiments, client devices (114, 116) may refer to computing devices that are connected to the network (108). The client devices (114, 116) utilize computer implemented services provided by other components of the system such as, for example, the data manager (120) and the storage system (130). Services provided by these components may include, but are not limited to, file system storage for client device (114, 116) such as fulfilling backup requests, restore requests, data deduplication requests, read or write requests, and/or other requests without departing from the invention. Each client device (114, 116) is implemented as a computing device. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that, when executed by the processor(s) of the computing device, causes the computing device to perform the functionality of a client device (114, 116) as described throughout this application.

In one or more embodiments, each client device (114, 116) is implemented as a logical device. The logical device may utilize the computing resources of any number of computing devices and thereby provide the functionality of a client device (114, 116) as described throughout this application.

In one or more embodiments, the data manager (120) is a system component that may include the functionality to communicate between the customer system (110) and the storage system (130) in order to manage data processing requests. The data manager stores and utilizes information about the system, the users of the system, and the data processing operations initiated by components of the customer system (110). The data manager (120) may service data processing requests issued by the customer system (110) by, for example, restricting or allowing any destructive data operations specified in the data processing requests. The data manager (120) includes functionality for managing data processing requests during or outside business hours, regardless of whether an administrator (112) is actively monitoring the system for security threats. The data manager (120) may include the functionality to detect repeated data operation attempts and notify the customer system (110). Additional details on the data manager (120) may be found, for example, in FIGS. 1B, 2A-2B.

In one or more embodiments, the data manager (12) may refer to a computing device that is connected to the network (108). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that, when executed by the processor(s) of the computing device, causes the computing device to perform the functionality of a data manager (120) as described throughout this application.

In one or more embodiments, the data manager (120) is implemented as a logical device. The logical device may utilize the computing resources of any number of computing devices and thereby provide the functionality of a data manager (120) as described throughout this application.

In one or more embodiments, the storage system (130) may include a plurality of storage devices (132, 134) without departing from the scope of the invention. The storage system may include the functionality to, but is not limited to, provide storage services to the customer system (110). Data such as files, file systems, or a plurality of other documents that require cybersecurity and data privacy measures may be stored in the storage system (130). The storage services may include the functionality to provide and/or obtain other services without departing from the invention. The storage system (130) may include any number of storage devices (132, 134) without departing from the invention.

In one or more embodiments of the invention, the storage system (130) is implemented as a computing device. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device it causes the computing device to perform the functionality of a storage system (130) as described throughout this application.

In one or more embodiments of the invention, the storage system (130) is implemented as a logical device. The logical device may utilize the computing resources of any number of computing devices and thereby provide the functionality of the storage system (106) as described throughout this application.

Figure 1B:
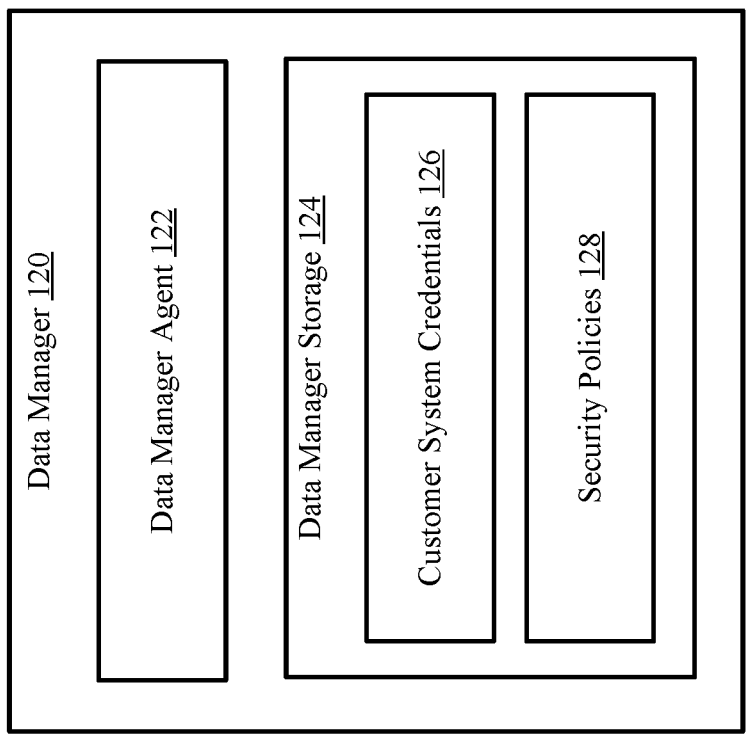
FIG. 1B shows a diagram of a data manager in accordance with one or more embodiments of the invention.

Turning now to FIG. 1B, FIG. 1B shows a diagram of a data manager (120) in accordance with one or more embodiments of the invention. The data manager of FIG. 1B may be an embodiment of the data manager (120, FIG. 1A) discussed above. The data manager (120) may include a data manager agent (122) and data manager storage (124). The data manager (120) may include additional, fewer, and/or different components without departing from the invention. Each of the aforementioned components of the data manager (120) is discussed below.

In one or more embodiments, the data manager agent (122) manages data processing requests obtained from the client system (110) for managing data stored in the storage system (130). For example, the data manager agent (122) may include the functionality to prevent or allow destructive data operations to occur on the storage system (130). The prevention or allowance of destructive data operations at any given time by the data manager (120) is dependent on the security policies (128) in the data manager storage (124), described below. Additional information on the functionality of the data manager agent may be found, for example, in FIG. 2B.

In one or more embodiments, the data manager storage (124) may include customer system credentials (126) and security policies (128). The data manager storage may include additional, fewer, and/or different components without departing from the invention. Each of the aforementioned components of the data manager storage (124) is discussed below.

In one or more embodiments, the customer system credentials (126) refer to the passwords, keys, or other methods of verifying that a user has clearance to conduct data processing operations on the customer system (110). Customer system credentials (126) may be used for verifying that a user on the customer system (110) has an administrative role. Since an administrator (112) has the capability to initiate destructive backup operations, if an attacker was able to obtain the customer system credentials (126) associated with an administrator (112), the attacker may able to destroy customer data, or at least initiate such destruction. In one or more embodiments, the customer system credentials (126) may also include a system-specific secret key necessary to set or reset the security policies (128) further discussed in FIG. 1C.

In one or more embodiments, the security policies (128) refer to a plurality of policies that each include a time period and a list of operations that are restricted during that time period. Any number of security policies (128) may be active at once. The security policies (128) may be manually implemented to protect customer data at any point in time, including during business and non-business hours. Security policies (128) may also be automatically implemented if repetitive failed attempts at requesting destructive data operations are detected by the data manager (120). Additional information on the security policies (128) may be found, for example, in FIGS. 1C, 2A-2B.

Figure 1C:
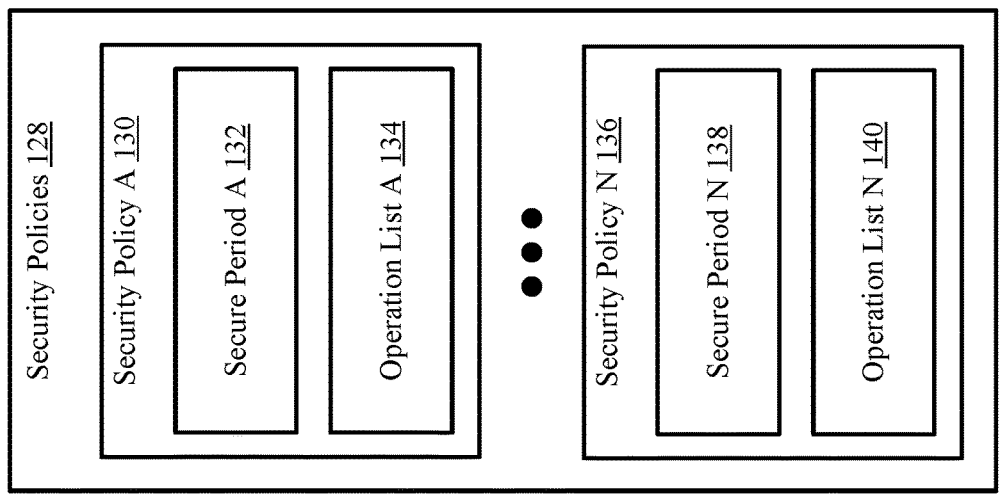
FIG. 1C shows a diagram of security policies in accordance with one or more embodiments of the invention.

Turning now to FIG. 1C, FIG. 1C shows a diagram of security policies in accordance with one or more embodiments of the invention. The security policies (128) of FIG. 1C may be embodiments of the security policies (128, FIG. 1B) discussed above. In one or more embodiments, there may be a plurality of security policies (130, 136) included in the security policies (128) in the data manager (120, FIG. 1B). Each security policy (130, 136) may include a secure period (132, 138) and an operation list (134, 140). The security policies (128) may include additional, fewer, and/or different components without departing from the invention. Each of the aforementioned components of the security policies (128) is discussed below.

In one or more embodiments, a secure period (132, 138) may refer to a period of time, specified in a security policy (130, 136), during which destructive data operations are restricted. Secure periods (132, 138) may not be revoked once configured, unless by a system-specific secret key, ensuring that even if an attacker is able to obtain administrative credentials, they will not be able to conduct destructive data operations for the duration of the set secure period (132, 138). A secure period (132, 138) may be continuous or recurring. For example, a continuous secure period may be active for up to 14 days. In one or more embodiments, a continuous secure period is a continuous period of time spanning, for example, multiple days. The continuous secure periods may be selected in cases like long weekends and holidays, wherein there will be no administrator (112, FIG. 1A) monitoring the customer system (110) for an extended period of time. Further, a continuous secure period may be selected when the system performs a complete reboot, to ensure that no attackers take advantage of any vulnerable state of the system right after the reboot to initiate attacks. In one or more embodiments, a recurring secure period is a repeating period of time spanning, for example, hours or days where an administrator (112, FIG. 1A) will not be monitoring the customer system (110). A recurring secure period can also be set to protect data outside of normal business hours, i.e. daily outside of business hours or weekly on weekends.

In one or more embodiments, when recurring secure periods are set and included in a security policy (130, 136), a system-specific secret key may also be generated. This secret key may be used to revoke a recurring secure period. In this manner, even if an attacker gains access to the user credentials stored in the customer system credentials (126), they would not be able to end a recurring secure period early without knowing the secret key. If an attacker is unable to end a recurring secure period, though they have obtained system credentials, data will still be protected from destructive operations attempted by the attacker. In one or more embodiments, in order to increase customer data security, all destructive data operations will be restricted for a configurable amount of time after the secure period (132, 138) is revoked. Different secure periods may be active at the same time, with different data processing operations restricted. The operations that are restricted during a secure period (132, 138) as specified by a security policy (130, 136) are discussed at length below.

In one or more embodiments, an operation list (134, 140) includes a list of operations that are restricted during a secure period (132, 138) as specified by a security policy (130, 136). An operation list may include destructive data operations that would put customer data at risk if not being actively monitored and approved by an administrator (112, FIG. 1A). Operations on an operation list (134, 140) may include, but are not limited to, any system commands that result in the deletion or destruction of customer data. These commands may include wide-scale destructive commands, such as, for example, "filesystem destroy," "cloud unit delete," "delete mtree," etc. An operation that is on an operation list (134, 140), if requested during the secure period (132, 138) specified in a security policy (130, 136), may be a destructive data operation and may not be allowed due to its destructive nature. The customer system (110, FIG. 1A) will receive a notification for each attempt of a destructive operation on an operation list (134, 140).

Figure 2A:
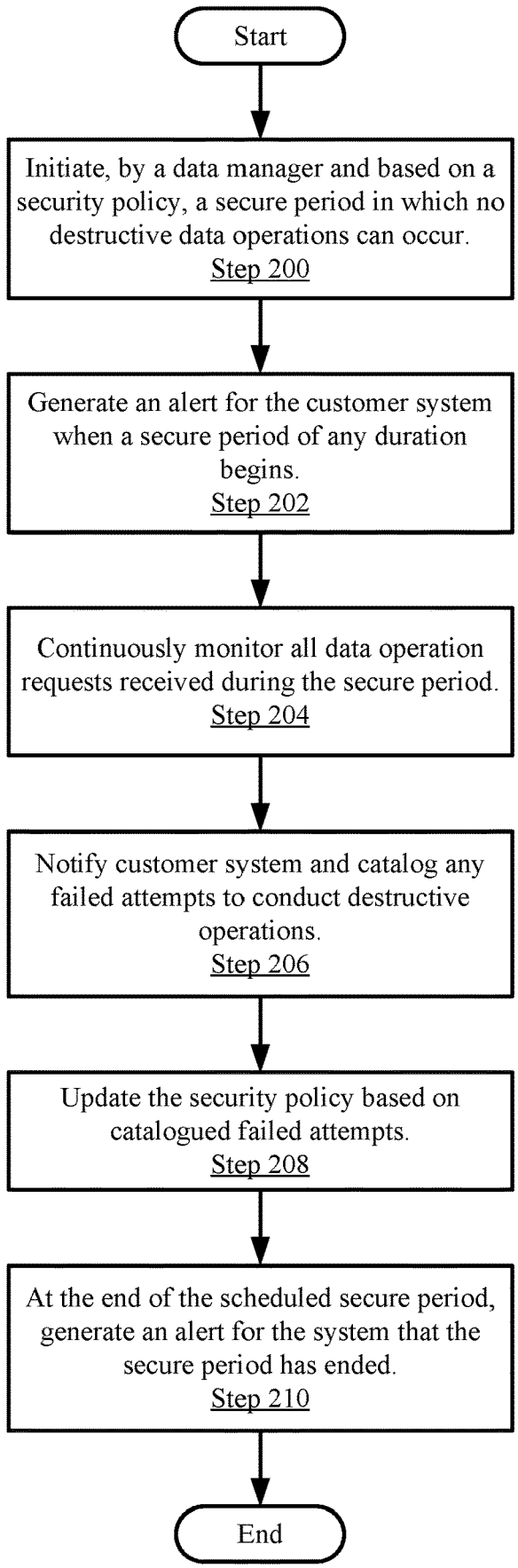
FIG. 2A shows a flowchart of a method for generating notifications about the status of a secure period in accordance with one or more embodiments of the invention.

FIG. 2A shows a flowchart of a method for generating notifications about the status of a secure period in accordance with one or more embodiments of the invention. The method may be performed by, for example, the data manager (120, FIG. 1A, FIG. 1B). Other components of the system illustrated in FIGS. 1A-1B may perform all, or a portion, of the method of FIG. 2A without departing from the invention.

While FIG. 2A is illustrated as a series of steps, any of the steps may be omitted, performed in a different order, include additional steps, and/or perform any or all of the steps in a parallel and/or partially overlapping manner without departing from the invention.

In Step 200, a secure period is initiated based on a security policy in which no destructive data operations can occur. The secure period may be continuous or recurring without departing from the invention. The secure period may be a daily or weekly secure period during non-business hours. The duration of the secure period and the data operations on the operation list that are restricted during that period are specified in the security policy.

In Step 202, an alert is generated by the data manager to notify the customer system when a secure period of any duration begins and a security policy is implemented.

In Step 204, data operation requests received by the data manager during the secure period are continuously monitored. In one or more embodiments, this includes all requests, whether destructive or non-destructive in nature. The operations are monitored, even if they are not included in the operation list specified in the active security policy.

In Step 206, any failed attempts to conduct destructive data operations are catalogued. The customer system is also notified whenever there are failed data operation attempts. This information is used by the customer system to determine if the system is at risk, and which updates are needed to improve the security policy. If there are repeated failed attempts, a new security policy (or an update to the active security policy) further limiting destructive operations may be automatically implemented by the data manager.

In Step 208, the active security policy is updated based on the catalogued failed attempts. Updates may include further restricting which destructive data operations can take place during the secure period, including additional commands in the operation list of the security policy, modifying the length of the secure period, the frequency of the recurring secure period, etc. The updated security policy will subsequently be stored in the data manager storage with the other security policies.

In Step 210, an alert is generated by the data manager to notify the customer system that a scheduled secure period has ended.

Figure 2B:
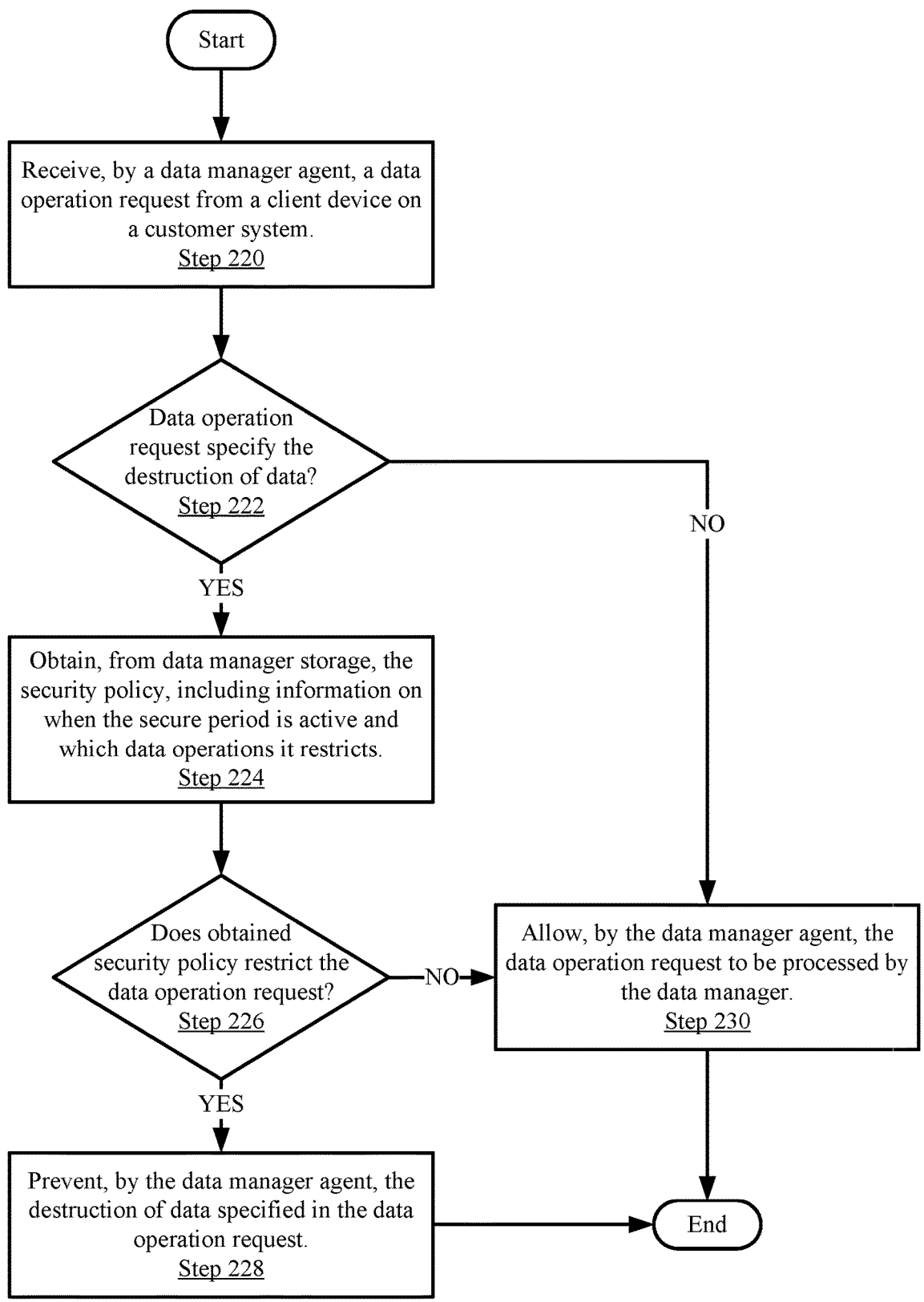
FIG. 2B shows a flowchart for processing a data operation request in accordance with one or more embodiments of the invention.

FIG. 2B shows a flowchart of a method for processing a data operation request in accordance with one or more embodiments of the invention. The method may be performed by, for example, the data manager (120, FIG. 1A, FIG. 1B). Other components of the system illustrated in FIGS. 1A-1B may perform all, or a portion, of the method of FIG. 2B without departing from the invention.

While FIG. 2B is illustrated as a series of steps, any of the steps may be omitted, performed in a different order, include additional steps, and/or perform any or all of the steps in a parallel and/or partially overlapping manner without departing from the invention.

In Step 220, a data operation request is received by a data manager agent from a client device on a customer system. This data operation request may or may not be destructive in nature. The data operation request may be received at any time, for example, during or outside of a secure period.

In Step 222, a determination is made about whether the data operation request received by the data manager agent specifies the destruction of data. If the data operation request specifies that data will be destroyed, i.e., the data operation request specifies a destructive data operation, the method proceeds to Step 224; if the data operation request does not specify that data will be destroyed, the method proceeds to Step 230.

In Step 224, the active security policy is obtained from the data manager storage. As discussed above, the security policy may include information such as the secure period and an operations list. The secure period included on the security policy specifies for what period of time the security policy is active, and the operations list includes a list of data operations that are restricted according to the security policy.

In Step 226, a determination is made about whether the obtained security policy restricts the data operation request received in Step 220. Even if the data operation request was determined to be destructive in Step 222, it may not be a destructive operation restricted by the obtained secure period. If the obtained security policy restricts the data operation request, the method proceeds to Step 228; if the obtained security policy does not restrict the data operation request, the method proceeds to Step 230.

In Step 228, the destruction of customer data specified in the data operation request received in Step 220 is prevented by the data manager. Though it may be a valid request from an administrator of the system, the implementation of the security policy prevents the destruction of data for the purpose of protecting customer data in case the destructive data request was part of an attack on the customer system. Once the restricted destructive data operation is prevented and reported to the data manager and customer system, the method may end following Step 228.

In Step 230, the data operation request is allowed by the data manager agent to be processed by the data manager. This data operation request may be destructive in nature, but it may not be one of the destructive operations that is restricted in the active security policy obtained in Step 224. The data operation request serviced by the data manager may not be destructive in nature, and it may be a read or write request for data in the storage system. As such, the data operation request is permitted. Once the requested data operation is allowed and processed, the method ends.

Figure 3:
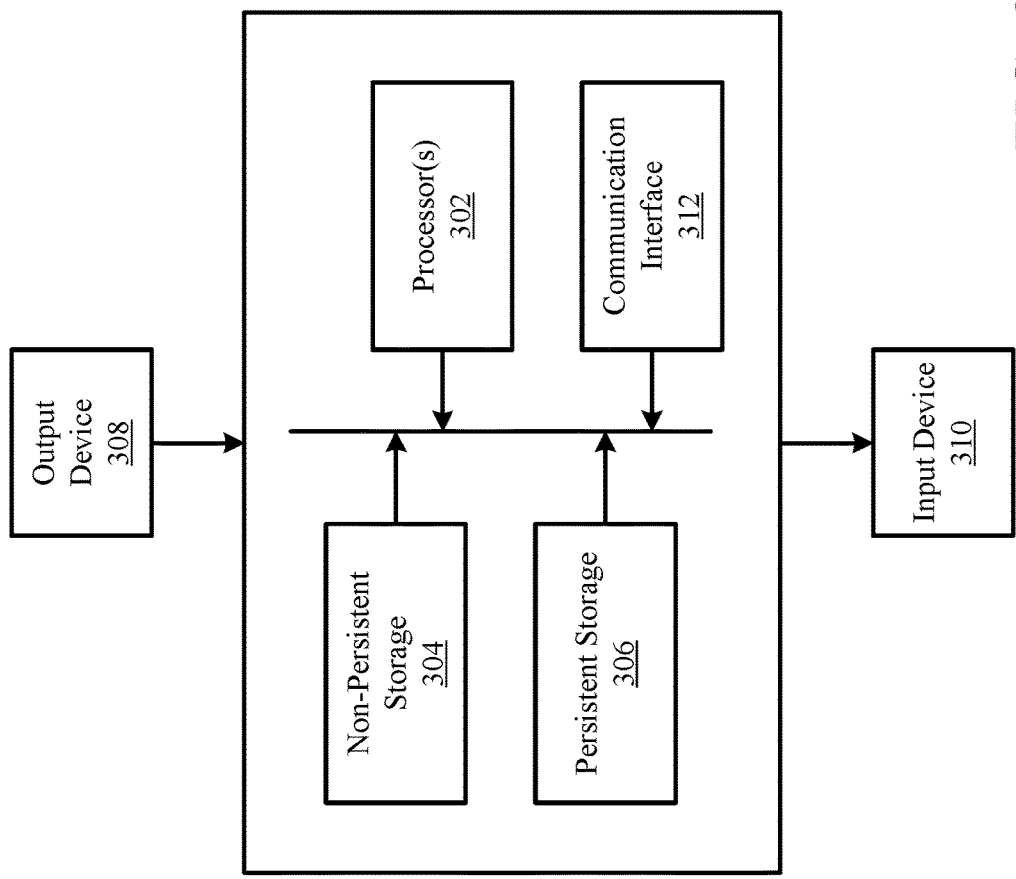
FIG. 3 shows a diagram of a computing device in accordance with one or more embodiments of the invention.

As discussed above, embodiments of the invention may be implemented using computing devices. Turning now to FIG. 3, FIG. 3 shows a diagram of a computing device in accordance with one or more embodiments of the invention. The computer (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) (302) may be one or more cores or micro-cores of a processor. The computer (300) may also include one or more input devices (310), such as a touchscreen, keyboard, mouse, microphone, touchpad, electronic pen, or any other type of input device. Further, the communication interface (312) may include an integrated circuit for connecting the computer (300) to a network (not shown) (e.g., a local area network (LAN), a wide area network (WAN) such as the Internet, mobile network, or any other type of network) and/or to another device, such as another computing device.

In one embodiment of the invention, the computer (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many diverse types of computing devices exist, and the aforementioned input and output device(s) may take other forms.

One or more embodiments of the invention may be implemented using instructions executed by one or more processors of the data manager. Further, such instructions may correspond to computer readable instructions that are stored on one or more non-transitory computer readable mediums.

One or more embodiments of the invention may improve the security level of one or more storage devices in a storage system. Specifically, embodiments of the invention relate to a method of protecting customer data in a storage system during non-business hours.

One or more embodiments of the invention relates to a method of implementing secure periods to restrict destructive data operations. Previous security measures include evaluating risk, whereas the implementation of secure periods reduce risk by preventing destructive data operations altogether. These secure periods may be configurable, and assist system administrators in preventing ransomware attacks that may lead to the widespread deletion of customer data. By implementing embodiments of the invention disclosed herein, customer data stored in storage devices will have a higher level of protection during non-business hours or holidays. With the automatic implementation of secure periods based on repetitive failed destructive data operation attempts, the system is capable of adapting in real time to threats even when not being actively monitored by an administrator. Further, important system features like secret keys and the delayed execution of destructive commands after the revocation of a secure period assist in protecting the system even if an attacker is able to obtain system credentials that allow them administrative access. Secure periods are configurable, secure, and protect the customer from total data loss when the system is at its most vulnerable.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for protecting a storage system, the method comprising:
   initiating, by a data manager and based on a security policy, a secure period;
   generating, by the data manager and in response to the initiating, an alert to notify a customer system when the secure period begins;
   monitoring, after the generating, data operation requests received during the secure period;
   receiving, after the monitoring, a first data operation request from a client device on the customer system;
   making a first determination that the first data operation request specifies a destructive operation of data in a storage system;
   making a second determination, using the security policy, that the first data operation request is restricted;
   restricting, in response to the second determination, destructive operations of data specified in the first data operation request;
   tracking, in response to the restricting, a number of restricted destructive operations attempted during the secure period; and
   updating the security policy based on the number, wherein updating the security policy comprises:
      further restricting which destructive data operations can take place during the secure period,
      modifying a duration of the secure period, and
      modifying a frequency of recurrence of the secure period.

2. The method of claim 1, wherein the security policy specifies destructive operations that should not occur on the storage system during the secure period.

3. The method of claim 1, wherein the data manager stores a plurality of security policies, wherein each security policy of the plurality of security policies includes a second secure period and an operation list, wherein the operation list specifies destructive operations restricted during the second secure period, wherein the security policy is one of the plurality of security policies.

4. The method of claim 1, further comprising:
   receiving, during the secure period, a second data operation request;
   making a third determination that the second data operation request does not specify destruction of data in the storage system; and
   processing, based on the second determination, the second data operation request.

5. The method of claim 1, further comprising:
   receiving, after the initiating, a second data operation request;

making a third determination that the second data operation request specifies a second destructive operation on data in the storage system;
making a fourth determination that the second destructive operation is not restricted by the security policy; and
processing, based on the third determination, the second data operation request.

6. The method of claim 1, further comprising:
generating an alert to notify the customer system when the secure period ends.

7. A non-transitory computer readable medium comprising computer readable program code, which when executed by a computer processor enables the computer processor to perform a method for managing remote memory, the method comprising:
initiating, by a data manager and based on a security policy, a secure period;
generating, by the data manager and in response to the initiating, an alert to notify a customer system when the secure period begins;
monitoring, after the generating, data operation requests received during the secure period;
receiving, monitoring, a first data operation request from a client device on the customer system;
making a first determination that the first data operation request specifies a destructive operation of data in a storage system;
making a second determination, using the security policy, that the first data operation request is restricted;
restricting, in response to the second determination, destructive operations of data specified in the first data operation request;
tracking, in response to the restricting, a number of restricted destructive operations attempted during the secure period; and
updating the security policy based on the number, wherein updating the security policy comprises:
further restricting which destructive data operations can take place during the secure period,
modifying a duration of the secure period, and
modifying a frequency of recurrence of the secure period.

8. The non-transitory computer readable medium of claim 7, wherein the security policy specifies destructive operations that should not occur on the storage system during the secure period.

9. The non-transitory computer readable medium of claim 7, wherein the data manager stores a plurality of security policies, wherein each security policy of the plurality of security policies includes a second secure period and an operation list, wherein the operation list specifies destructive operations restricted during the second secure period, wherein the security policy is one of the plurality of security policies.

10. The non-transitory computer readable medium of claim 7, further comprising:
receiving, during the secure period, a second data operation request;
making a third determination that the second data operation request does not specify destruction of data in the storage system; and
processing, based on the second determination, the second data operation request.

11. The non-transitory computer readable medium of claim 7, further comprising:
receiving, after the initiating, a second data operation request;
making a third determination that the second data operation request specifies a second destructive operation on data in the storage system;
making a fourth determination that the second destructive operation is not restricted by the security policy; and
processing, based on the third determination, the second data operation request.

12. The non-transitory computer readable medium of claim 7, further comprising:
generating an alert to notify the customer system when the secure period ends.

13. A system for protecting a storage system, comprising:
a data manager comprising a processor; and
memory, including instruction, which, when executed by the processor, performs a method comprising:
initiating, based on a security policy, a secure period;
generating, by the data manager and in response to the initiating, an alert to notify a customer system when the secure period begins;
monitoring, after the generating, data operation requests received during the secure period;
receiving, monitoring, a first data operation request from a client device on the customer system;
making a first determination that the first data operation request specifies a destructive operation of data in a storage system;
making a second determination, using the security policy, that the first data operation request is restricted;
restricting, in response to the second determination, destructive operations of data specified in the first data operation request;
tracking, in response to the restricting, a number of restricted destructive operations attempted during the secure period; and
updating the security policy based on the number, wherein updating the security policy comprises:
further restricting which destructive data operations can take place during the secure period,
modifying a duration of the secure period, and
modifying a frequency of recurrence of the secure period.

14. The system of claim 13, wherein the security policy specifies destructive operations that should not occur on the storage system during the secure period.

15. The system of claim 13, wherein the data manager stores a plurality of security policies, wherein each security policy of the plurality of security policies includes a second secure period and an operation list, wherein the operation list specifies destructive operations restricted during the second secure period, wherein the security policy is one of the plurality of security policies.

16. The system of claim 13, the method further comprising:
receiving, during the secure period, a second data operation request;
making a third determination that the second data operation request does not specify destruction of data in the storage system; and
processing, based on the second determination, the second data operation request.

17. The system of claim 13, the method further comprising:
receiving, after the initiating, a second data operation request;

making a third determination that the second data operation request specifies a second destructive operation on data in the storage system;
making a fourth determination that the second destructive operation is not restricted by the security policy; and
processing, based on the third determination, the second data operation request.

\* \* \* \* \*